US012327120B2

United States Patent
Lin et al.

(10) Patent No.: US 12,327,120 B2
(45) Date of Patent: Jun. 10, 2025

(54) VERIFIED STACK TRACE GENERATION AND ACCELERATED STACK-BASED ANALYSIS WITH SHADOW STACKS

(71) Applicant: Microsoft Technology Licensing, LLC, Redmond, WA (US)

(72) Inventors: Jin Lin, Seattle, WA (US); Jason Lin, Bellevue, WA (US); Niraj Majmudar, Renton, WA (US); Mehmet Iyigun, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1153 days.

(21) Appl. No.: 17/037,605

(22) Filed: Sep. 29, 2020

(65) Prior Publication Data

US 2021/0011717 A1    Jan. 14, 2021

Related U.S. Application Data

(63) Continuation-in-part of application No. 16/417,493, filed on May 20, 2019, now Pat. No. 11,294,682.

(51) Int. Cl.
*G06F 9/38*     (2018.01)
*G06F 11/07*    (2006.01)
(Continued)

(52) U.S. Cl.
CPC ........ *G06F 9/3806* (2013.01); *G06F 11/0778* (2013.01); *G06F 11/366* (2013.01);
(Continued)

(58) Field of Classification Search
CPC .. G06F 9/3806; G06F 11/0778; G06F 11/366; G06F 9/323
See application file for complete search history.

(56) References Cited

U.S. PATENT DOCUMENTS 6,951,011 B1    9/2005 Sexton
7,039,833 B2 *  5/2006 Knuutila ............... G06F 11/366
                                                   714/26

(Continued)

FOREIGN PATENT DOCUMENTS

CN    103019707 A    4/2013
CN    106708488 A    5/2017
CN    109409083 A    3/2019

OTHER PUBLICATIONS

Gang Chen, Hai Jin, Deqing Zou, Bing Bing Zhou, Zhenkai Liang, Weide Zheng, and Xuanhua Shi, "SafeStack: Automatically Patching StackBased Buffer Overflow Vulnerabilities", Jun. 11, IEEE, pp. 368-379 (Year: 2013).*

(Continued)

*Primary Examiner* — Courtney P Spann

(57) ABSTRACT

A verified stack trace can be generated by utilizing information contained in a shadow stack, such as a hardware protected duplicate stack implemented for malware prevention and computer security. The shadow stack contains return addresses which are obtainable without requiring an unwinding of the traditional call stack. As such, triaging based on return address information can be performed more quickly and more efficiently, and with a reduced utilization of processing resources. Additionally, the generation of a verified stack trace can be performed, with such a verified stack trace containing return addresses that are known to be correct and not corrupted. The return addresses can either be read from the traditional call stack, or derived therefrom, and then verified by comparison to corresponding return addresses from the shadow stack, or they can be read directly from the shadow stack.

20 Claims, 7 Drawing Sheets

(51) Int. Cl.
   *G06F 11/362* (2025.01)
   *G06F 9/30* (2018.01)
   *G06F 9/32* (2018.01)

(52) U.S. Cl.
   CPC ........ *G06F 9/3005* (2013.01); *G06F 9/30054* (2013.01); *G06F 9/323* (2023.08)

(56) References Cited

U.S. PATENT DOCUMENTS

| | | | | |
|---|---|---|---|---|
| 7,581,089 | B1 | 8/2009 | White | |
| 8,719,791 | B1 | 5/2014 | Macpherson | |
| 8,949,672 | B1* | 2/2015 | Srihamat | G06F 11/366 714/38.1 |
| 9,589,074 | B2* | 3/2017 | Bhattacharjee | G06F 16/9038 |
| 9,836,343 | B2* | 12/2017 | Zhang | G06F 11/0715 |
| 2003/0005414 | A1* | 1/2003 | Elliott | G06F 11/0778 717/130 |
| 2003/0135847 | A1* | 7/2003 | Gouriou | G06F 9/4486 712/E9.083 |
| 2003/0204838 | A1 | 10/2003 | Caspole et al. | |
| 2006/0218562 | A1 | 9/2006 | Broman et al. | |
| 2007/0074149 | A1* | 3/2007 | Ognev | G06F 11/366 717/126 |
| 2007/0234294 | A1 | 10/2007 | Gooding | |
| 2011/0145800 | A1 | 6/2011 | Rao et al. | |
| 2015/0074462 | A1* | 3/2015 | Jacoby | G06F 11/079 714/37 |
| 2015/0347271 | A1 | 12/2015 | Payne et al. | |
| 2016/0092673 | A1 | 3/2016 | Lemay et al. | |
| 2018/0004531 | A1 | 1/2018 | Chen et al. | |
| 2018/0018460 | A1 | 1/2018 | Brown et al. | |
| 2019/0050566 | A1 | 2/2019 | Lemay et al. | |
| 2020/0371809 | A1 | 11/2020 | Niu et al. | |
| 2022/0214882 | A1 | 7/2022 | Niu et al. | |

OTHER PUBLICATIONS

Notice of Allowance mailed on Jan. 24, 2024, in U.S. Appl. No. 17/702,714, 3 pages.
"Ex Parte Quayle Action Issued in U.S. Appl. No. 17/702,714", Mailed Date: Apr. 26, 2023, 11 Pages.
"Office Action Issued in European Patent Application No. 20723683.7", Mailed Date: May 10, 2023, 7 Pages.
Li, et al., "Zipper Stack: Shadow Stacks Without Shadow", in Repository of arXiv:1902.00888v3, Jul. 15, 2020, 20 Pages.
Phang, et al., "Expositor: Scriptable Time-Travel Debugging with First-Class Traces", in Proceedings of 35th International Conference on Software Engineering, May 18, 2013, pp. 352-361.
"International Search Report and Written Opinion Issued in PCT Application No. PCT/US2021/037146", Mailed Date: Oct. 11, 2021, 13 Pages.
"Final Office Action Issued in U.S. Appl. No. 16/417,493", Mailed Date: Jan. 22, 2021, 32 Pages.
"Profiling Overview", Retrieved From: https://docs.microsoft.com/en-us/dotnet/framework/unmanaged-api/profiling/profiling-overview, Mar. 30, 2017, 9 Pages.
"Office Action Issued in Indian Patent Application No. 202147047279", Mailed Date: Sep. 21, 2023, 8 Pages.
"Non Final Office Action Issued in U.S. Appl. No. 16/417,493", Mailed Date: Jul. 6, 2020, 27 Pages.
"Notice of Allowance Issued in U.S. Appl. No. 16/417,493", Mailed Date: Sep. 15, 2021, 13 Pages.
Burow, et al., "SoK: Shining Light on Shadow Stacks", in Proceedings of IEEE Symposium on Security and Privacy, May 19, 2019, pp. 985-999.
"International Search Report and Written Opinion Issued in PCT Application No. PCT/US20/027813", Mailed Date: Jul. 14, 2020, 15 Pages.
Sinnadurai, et al., "Transparent Runtime Shadow Stack: Protection Against Malicious Return Address Modifications", Retrieved from: https://citeseerx.ist.psu.edu/viewdoc/download?doi=10.1.1.120.5702&rep=rep1&type=pdf, Jan. 1, 2008, 11 Pages.
"Eternal Champion Exploit Analysis", Retrieved from: https://msrc-blog.microsoft.com/2017/06/29/eternal-champion-exploit-analysis/, Jun. 29, 2017, 20 Pages.
"Multiple Chinese Threat Groups Exploiting CVE-2018-0798 Equation Editor Vulnerability Since Late 2018", Retrieved from: https://www.anomali.com/blog/multiple-chinese-threat-groups-exploiting-cve-2018-0798-equation-editor-vulnerability-since-late-2018, Jul. 3, 2019, 13 Pages.
Branscombe, Mary, "Windows 10 security: How the shadow stack will help to keep the hackers at bay", Retrieved from: https://www.techrepublic.com/article/windows-10-security-how-the-shadow-stack-will-help-to-keep-the-hackers-at-bay/, Apr. 3, 2020, 13 Pages.
Lin, Jason, "Control-flow Enforcement Technology", Retrieved from: https://osgwiki.com/wiki/Control-flow_Enforcement_Technology#Upgrading_user-mode_CET_mitigation_policy_at_runtime_via_SetProcessMitigationPolicy, Aug. 3, 2020, 7 Pages.
Pulapaka, Hari, "Understanding Hardware-enforced Stack Protection", Retrieved from: https://techcommunity.microsoft.com/t5/windows-kernel-internals/understanding-hardware-enforced-stack-protection/ba-p/1247815, Mar. 24, 2020, 7 Pages.
Roberston, et al., "/CETCOMPAT (Cet Shadow Stack compatible)", https://docs.microsoft.com/en-us/cpp/build/reference/cetcompat?view=vs-2017, Jun. 30, 2020, 2 Pages.
Roberston, et al., "/NXCOMPAT (Compatible with Data Execution Prevention)", Retrieved from: https://docs.microsoft.com/en-us/cpp/build/reference/nxcompat-compatible-with-data-execution-prevention?view=vs-2019, Dec. 17, 2019, 8 Pages.
Satran, et al., "PE Format", https://docs.microsoft.com/en-us/windows/desktop/debug/pe-format#extended-dll-characteristics, Aug. 11, 2020, 106 Pages.
"Control-flow Enforcement Technology Specification", Revision 3.0, Retrieved from: https://software.intel.com/sites/default/files/managed/4d/2a/control-flow-enforcement-technology-preview.pdf, May 2019, 358 Pages.
"Notice of Allowance Issued in U.S. Appl. No. 17/702,714", Mailed Date: Oct. 4, 2023, 5 Pages.
Communication under rule 71(3) received for European Application No. 20723683.7, mailed on May 24, 2024, 8 pages.
Office Action Received for European Application No. 21739837.9, mailed on May 8, 2024, 8 pages.
Decision to grant a European patent pursuant to Article 97(1) received in European Application No. 21739837.9, mailed on Sep. 19, 2024, 2 pages.
Office Action Received for Chinese Application No. 202080037709.2, mailed on Dec. 27, 2024, 11 pages. (English translation Provided).

* cited by examiner

VERIFIED STACK TRACE GENERATION AND ACCELERATED STACK-BASED ANALYSIS WITH SHADOW STACKS

CROSS-REFERENCE TO RELATED APPLICATION

This application is a continuation-in-part of, claims the benefit of, and priority to, U.S. patent application Ser. No. 16/417,493, entitled "Stack Traces Using Shadow Stack", and filed on May 20, 2019, the contents of each of which are herein expressly incorporated by reference in their entirety.

BACKGROUND

The execution of computer-executable instructions can generate unintended consequences, such as due to a fault or error in the programming generated by a programmer, a glitch or other like hardware malfunction, or combinations thereof. Such unintended consequences are colloquially referred to as "bugs". Analogously, the analysis of bugs, for purposes of identifying the cause of such unintended consequences, and remedying them to avoid future re-occurrences of those unintended consequences, is colloquially referred to as "debugging". Debugging often entails obtaining information from execution stacks, in the form of one or more data structures, that represent information retained by the execution of individual instructions by a microprocessor, such as a central processing unit (CPU). The data obtained from a stack is often referred to as a "stack trace" and provides valuable information to assist in debugging. One such piece of data is the return addresses placed onto the stack by the execution of instructions, such as a CALL instruction, that cause the execution to jump to an instruction other than the next subsequent instruction.

Bugs often cause, or are associated with, the corruption of data, which can include corruption of the data of the stack. Debugging is very difficult to perform when relevant data, such as the return addresses on the stack, are corrupted or even missing entirely. Additionally, debugging, especially when performed on large quantities of data, is inefficient. More specifically, as part of debugging, one or more return addresses are generated from information contained in the stack trace utilizing a reverse engineering process known as "unwinding". Unwinding, especially when performed repeatedly, consumes processor cycles and introduces inefficiencies.

In some instances, such as in cloud computing environments, debugging cannot be performed at the time the bug occurs. Instead, a collection of a broad swath of data is performed, with the hopes that such data includes the information relevant to performing the debugging, and that future analysis of such data will be able to successfully debug the bug. Such a collection of data is often referred to as a "dump" of data, and automated mechanisms are utilized to triage such dumps in order to focus, and thereby render more effective, subsequent human analysis thereof. For example, analysis of one or more data dumps may reveal a particular set of characteristics that are associated with a specific bug. Other data dumps can be evaluated for the existence of those characteristics, thereby enabling data dumps to be triaged between those that exhibit the characteristics of known bugs, and those which represent previously unidentified, or unreviewed, errors, such as previously unknown bugs. Human effort can then be focused on the unknown bugs. The evaluation of data dumps for purposes of detecting characteristics includes the unwinding of stack traces, which, as indicated, is inefficient. Accordingly, the evaluation and triaging of large quantities of data dumps, such as would be generated in cloud computing environments, consumes substantial processing resources, including CPU cycles, memory, and other like computing resources.

SUMMARY

A verified stack trace can be generated by utilizing information contained in a shadow stack, such as a hardware protected duplicate stack implemented for malware prevention and computer security. The shadow stack contains return addresses which are obtainable without requiring an unwinding of the traditional call stack. As such, triaging based on return address information can be performed more quickly and more efficiently, and with a reduced utilization of processing resources. Additionally, the generation of a verified stack trace can be performed, with such a verified stack trace containing return addresses that are known to be correct and not corrupted. The return addresses can either be read from the traditional call stack, or derived therefrom, and then verified by comparison to corresponding return addresses from the shadow stack, or they can be read directly from the shadow stack.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1A:
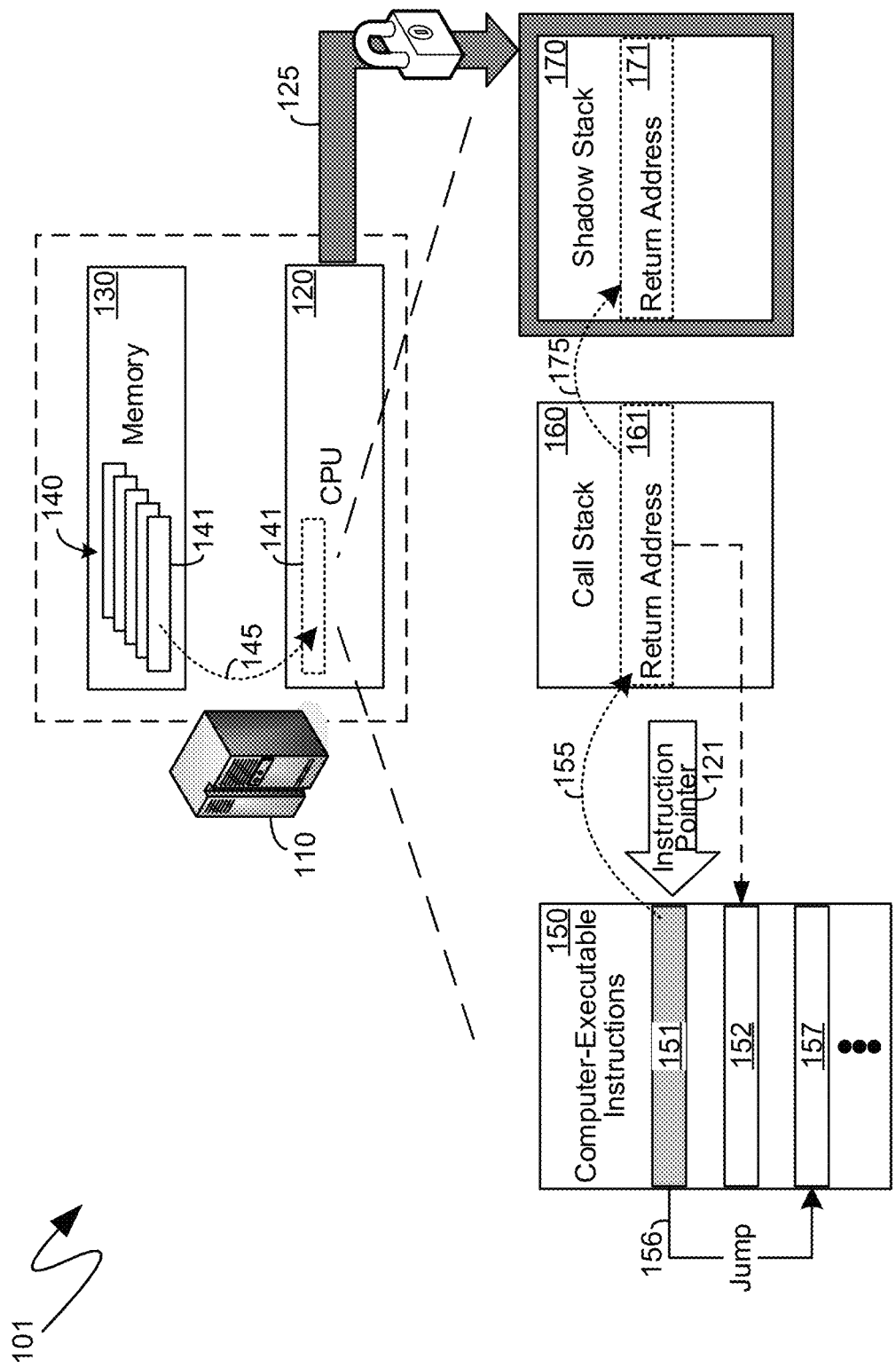
FIGS. 1a-b are system diagrams of an exemplary system implementing a shadow stack.

The following description relates to the utilization of shadow stack data for purposes other than the protection and security of a computing device, namely to render more efficient and more accurate the analysis of unintended consequences that occur during the execution of computer-executable instructions. A verified stack trace can be generated by utilizing information contained in the shadow stack. The shadow stack contains return addresses which are obtainable without requiring an unwinding of the traditional call stack. As such, triaging based on return address information can be performed more quickly and more efficiently, and with a reduced utilization of processing resources. Additionally, the generation of a verified stack trace can be performed, with such a verified stack trace containing return addresses that are known to be correct and not corrupted. The return addresses can either be read from the traditional call stack, or derived therefrom, and then verified by comparison to corresponding return addresses from the shadow stack, or they can be read directly from the shadow stack.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1B:
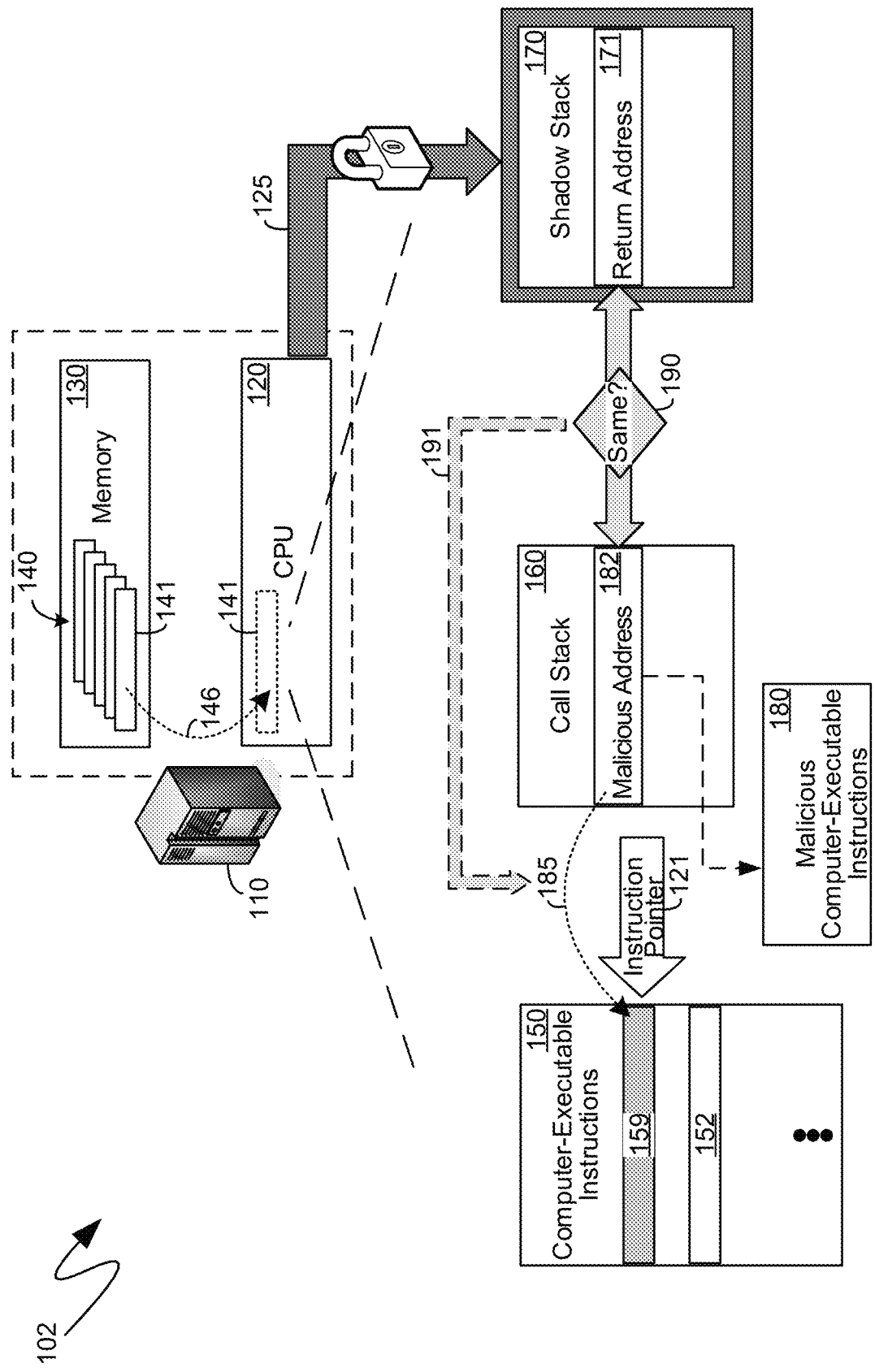

With reference to FIGS. 1a and 1b, exemplary systems 101 and 102 are illustrated, providing context for the descriptions below. More specifically, the exemplary systems 101 and 102 illustrate an intended operation of a shadow stack, such as the exemplary shadow stack 170, namely to prevent the execution of malicious computer-executable instructions, and otherwise protect the computing device.

Turning first to the exemplary system 101 illustrated in FIG. 1a, the exemplary system 101 is shown as comprising a computing device, such as the exemplary computing device 110. The exemplary computing device comprises one or more microprocessor-based processing units, such as the ubiquitous Central Processing Unit (CPU). One or more CPUs are represented by the exemplary CPU 120 shown in FIG. 1a. On modern computing devices, the execution of computer-executable instructions is performed within the context of multiple execution threads, such as the exemplary threads 140. When a thread, such as the exemplary thread 141, is to be executed by the CPU 120, the thread is loaded from a computer-readable storage medium, such as the exemplary memory 130, onto the CPU 120. In the exemplary system 101, the loading of the exemplary thread 141 onto the CPU 120 is illustrated by the action 145.

The execution of a thread by the CPU 120 entails the performance of individual computer-executable instructions, such as the exemplary computer-executable instructions 150. An instruction pointer, such as the exemplary instruction pointer 121, of the CPU 120, identifies an instruction to be executed. In the exemplary system 101, the exemplary instruction 151, identified by the instruction pointer 121, can be a CALL instruction, or other like instruction that results in a jump 156 in the execution of the computer-executable instructions 150 from the instruction 151, to a different, nonconsecutive instruction, such as the exemplary instruction 157. As part of the CALL instruction 151, a return address, such as the exemplary return address 161, is written onto a call stack, such as the exemplary call stack 160, which is associated with the execution of the computer-executable instructions 150 within the context of the executing thread 141. As utilized herein, the term "stack", by itself, means any hardware or software implemented structure that temporarily stores data in a first-in-last-out format. Within the context of processing units, such as the CPU 120, a "stack", as that term is utilized herein, means the hardware processing unit support for the temporary receipt, storage and subsequent provision of return addresses, function-local data, function parameters and other like information. The term "call stack", as utilized herein, means a data structure that comprises at least one or more return addresses. A "call stack" can optionally also include additional parameters, function-local data, and other like information. The term "stack trace", as utilized herein, means the reconstruction of an execution flow by discovering the values of return addresses placed onto a call stack. A "stack trace" can further include the reconstruction of an execution flow by discovering other values placed onto a call stack, such as additional parameters, function-local data, and other like information. The terms "stack trace" and "backtrace" all have the same meaning as utilized herein and the verbs "stack tracing", "backtracing" and "stack unwinding" all have the same meaning as utilized herein, namely the generation of the aforedefined "stack trace". The writing of the return address 161 onto the call stack 160 is illustrated by the action 155, which is performed as part of the execution of the instruction 151 by the CPU 120. Within the exemplary system 101, the return address 161 is illustrated as identifying the address of the instruction 152. Once the execution of the computer-executable instructions (to which execution jumped after the execution of the instruction 151) is completed, the execution will return to the address specified by the return address 161 and continue instruction therefrom. Thus, in the exemplary system 101, the execution will return to the computer-executable instruction 152, as identified by the return address 161, an execution of the computer-executable instructions 150 by the CPU 120 will continue therefrom.

Because a stack, such as the exemplary call stack 160, is a data structure maintained in read/write memory, the data stored therein is subject to being overwritten. In some instances, such overwriting is maliciously performed. For example, if a return address, such as the exemplary return address 161, is modified to identify different computer-executable instructions, such as malicious computer-executable instructions, then many known mechanisms for preventing the execution of such malicious instructions are bypassed, and the malicious instructions will be executed, despite efforts to prevent their execution.

One mechanism to modify portions of a stack, including return addresses stored thereon, takes advantage of poorly designed computer-executable instructions that allow the modification of data without verification as to size or boundary. More specifically, malicious computer-executable instructions attempt to store a value, utilizing allowed commands, with the size of the value that is attempted to be stored being substantially greater than the size that was expected or allowed for by the existing mechanisms. In such an instance, if such a large value is, in fact, written to memory, it will exceed the portion of memory set aside for it and will "overrun" that portion and, thereby, cause modification to subsequent sections of memory. If one such subsequent section comprises the return address of a stack, the return address will modified, including being modified to identify a new location in memory.

To prevent such overrun mechanisms from being utilized to bypass other protections and trigger execution of malicious computer-executable instructions, modern CPUs, and other like microprocessors, have been modified to include mechanisms by which return addresses written to a stack are protected, including through hardware-based protections. Such protection mechanisms include the utilization of a second stack data structure whose contents are protected from being improperly overwritten by hardware-based protections. Such a second stack data structure is referred to as a "shadow stack".

Turning back to FIG. 1a, the exemplary CPU 120 includes so-called "Control-flow Enforcement Technology" or "CET" (also called "Hardware-enforced Stack Protection" or "HSP") and, as such, includes hardware mechanisms that utilize a shadow stack, such as the exemplary shadow stack 170. Moreover, the data stored in the shadow stack 170 is hardware protected, as illustrated by the protections 125. When a CPU having control-flow enforcement technology executes an instruction that places a return address on a call stack, such as the execution of the exemplary CALL instruction 151, resulting in the placement of the return address 161 on the exemplary call stack 160, the CPU 120 further copies that return address 161 to the shadow stack 170. As illustrated in the exemplary system 101, such a copy 175 results in a copy of the return address 161, in the form of the return address 171, being stored as part of the shadow stack 170. Although illustrated as being copied from the call stack 160, the return address 171 can be written onto the shadow stack 170 approximately, or exactly, concurrently with the writing of the return address 161 onto the call stack 160 by the execution of the CALL instruction 151 by the CPU 120.

Turning to the exemplary system 102 shown in FIG. 2b, the utilization of the shadow stack 170, and the data stored thereon, to prevent the execution of malicious computer-executable instructions, and to further protect the computer system, is illustrated. More specifically, in the exemplary system 102, the return address 161 that was placed on the call stack 160 by the execution of the CALL instruction 151, as illustrated exemplary system 101, has been replaced with a malicious address 182 that points to, or otherwise identifies, malicious computer-executable instructions, such as the exemplary malicious computer-executable instructions 180.

As indicated previously, such a malicious address 182 can have been written onto the call stack 160 either intentionally (e.g., code obfuscation techniques), or due to a bug (e.g., an overrun of data written to another destination that was not properly range-bound, use-after-free bugs, or type-confusion bugs), or other like mechanisms. In some situations, a modification of the call stack 160 will have occurred while the call stack 160 was stored in memory 130 as part of the execution thread 141, such as when the execution thread 141 was temporarily stored in the memory 130 while a different execution thread was being executed by the CPU 120.

The subsequent restoring of the execution thread 141 to the CPU 120, as illustrated by the action 146 can result in execution resuming with a computer-executable instructions, such as the exemplary computer-executable instruction 159. The exemplary computer-executable instructions 159 can be a RET instruction, which "pops" a return address off of the call stack 160 and continue execution with the computer-executable instructions identified by the return address. In the specific example illustrated in the systems 101 and 102, if the return address 161 was still stored on the call stack 160 when the RET instruction 159 was executed, the popping of the return address 161 off of the call stack 160 would have resulted in execution of the computer-executable instructions 150 proceeding with the instruction 152, since that instruction was identified by the return address 161 as illustrated by the exemplary system 101. However, in the exemplary system 102, the exemplary malicious address 182 does not identify the exemplary instruction 152, but rather identifies the exemplary malicious computer executable instructions 180. Consequently, when the RET instruction 159 is executed, and the malicious address 182 is read from the call stack 160, as illustrated by the action 185, processing will proceed with execution of the malicious computer-executable instructions 180.

To prevent the above-described attack vector, the exemplary CPU 120 implements the aforementioned CET (or HSP), in the form of the shadow stack 170. More specifically, and as illustrated by the exemplary system 101, the writing of the return address 161 onto the call stack 160 results in the writing of the same return address (assigned the number 171 in FIGS. 1a and 1b to signify that it is a different copy) onto the shadow stack 170. Subsequently, when an instruction, such as the exemplary RET instruction 159 is executed, prior to execution proceeding with the execution of computer-executable instructions starting at the address identified on the call stack 160, the CPU 120 compares the address stored on the call stack 160 with the corresponding address stored on the shadow stack 170. In the exemplary system 102, such a comparison 190 compares the malicious address 182, which was maliciously inserted into the call stack 160 in the place of the previously stored return address 161, to the return address 171 (which, as indicated, is a copy of the return address 161). Such a determination reveals that the malicious address 182 differs from the return address 171. Further execution can then be halted, such as by generating an error, and interrupt, or other like prevention of the further execution of the instructions identified by the malicious address 182 can be performed. Such prevention of the exemplary RET instruction 159 receiving the address 182 from the call stack 160, and continuing execution from the address identified thereby, is graphically represented in FIG. 1b by the arrow 191.

As can be seen, the shadow stack is part of the aforementioned CET (or HSP) that was implemented for the sole purpose of preventing the execution of malicious computer-executable instructions and protecting the computer system therefrom. The mechanisms described herein, however, utilize the shadow stack for an entirely different purpose. In particular, the mechanisms described herein utilize the shadow stack to improve debugging. As defined above, the term "bug" means the consequences that result from the execution of computer-executable instructions were not intended by the programmer, including due to faulty programming, unexpected interactions between different sets of computer-executable instructions, hardware failures, and other like causes of unintended consequences in the execution of computer-executable instructions.

In performing "debugging", attempts to identify the cause of the bug often include reconstruction of the call stack and analysis of data from the call stack, since such data can indicate the computer-executable instructions, subroutine, process, or other like construct that was being executed when the unintended consequence occurred. Reconstruction is difficult without debug symbols because guesses must be made as to which values in a stack are return addresses. Even with debug symbols, however, if there is stack corruption, reconstruction may be impossible as the stack values (including the call stack) may be unrelated to the original call stack values. This can be true even with only a single call stack value on the stack being overwritten, since it may be difficult or impossible to accurately reconstruct the call stack And, unfortunately, unintended consequences often include the corruption of data. As such, the information obtained from a call stack may not be accurate, since it may have been corrupted, lost, or otherwise be inaccurate and reconstruction of the call stack may be impossible.

Figure 2:
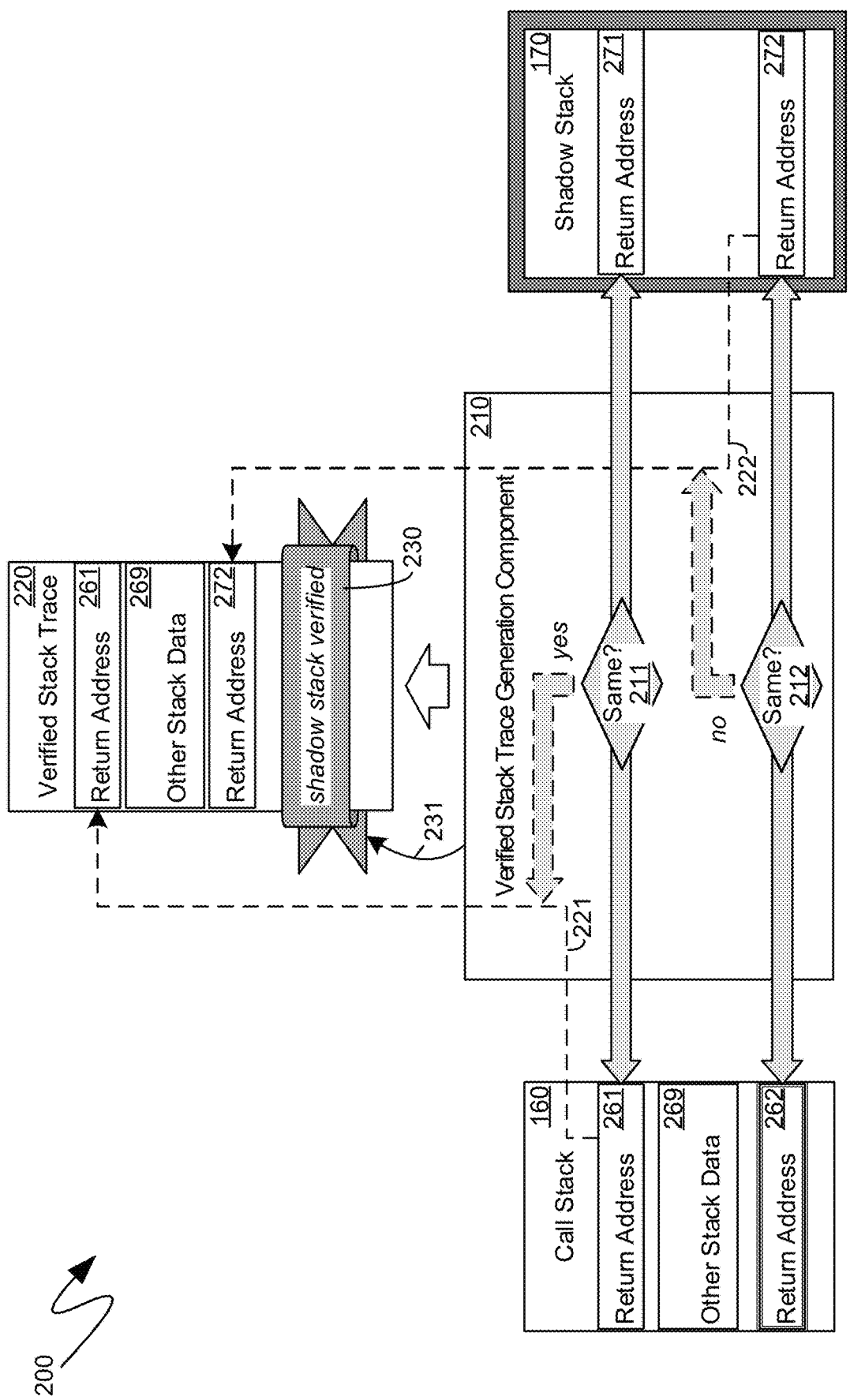
FIG. 2 is a system diagram of an exemplary generation of a verified stack trace utilizing shadow stack data.

Turning to FIG. 2, the exemplary system 200 shown therein illustrates a verified stack trace generation component, such as the exemplary verified stack trace generation component 210, which generates a verified stack trace, such as the exemplary verified stack trace 220. In particular, the verified stack trace generation component 210 utilizes data from the shadow stack 170 to verify the correctness and accuracy of at least some of the data being presented in the verified stack trace 220 that is generated thereby, namely the return addresses.

A traditional stack trace is generated by obtaining the data on the call stack 160, such as when an unintended consequence, exception or fault occurs during execution of computer-executable instructions. As illustrated in the exemplary system 200, during execution of computer-executable instructions, a corresponding call stack can include return addresses, such as was detailed above. The exemplary call stack 160 is illustrated in the exemplary system 200 of FIG. 2 as comprising two return addresses, namely the exemplary return addresses 261 and 262. In addition to return addresses, a call stack, such as the exemplary call stack 160, can contain other stack data, such as the exemplary other stack data 269, which can be data placed onto the call stack 160 by the execution of other computer-executable instructions, including values assigned to one or more variables, counters, or other like data structures. As detailed above, such other stack data 269 may not have been copied over and protected within the construct of the shadow stack 170. However, the return addresses, such as the exemplary return addresses 261 and 262 will have corresponding copies in the shadow stack 170, namely the exemplary return addresses 271 and 272, respectively.

When generating the verified stack trace 220, the verified stack trace generation component 210 verifies the correctness of information obtained from the call stack 160 by comparing that information to the corresponding information in the shadow stack 170. More specifically, in the case of return addresses, such as the exemplary return addresses 261 and 262, the verified stack trace generation component 210 compares those return addresses to the corresponding exemplary return addresses 271 and 272 from the shadow stack 170. Such comparisons are graphically represented in FIG. 2 as the comparisons 211 and 212. According to one aspect, hardware mechanisms implemented by the CPU are utilized to perform the comparisons 211 and 212 in the same manner as such comparisons would be performed when a return address was read from the call stack, such as in the context of the exemplary system 102 described above.

According to another aspect, however, the comparisons 211 and 212 are performed via software, such as through existing software-invocable interfaces by which data can be obtained from the shadow stack 170.

If the comparisons, such as the exemplary comparisons 211 and 212, reveal that the return addresses 261 and 262, from the call stack 160, are the same as the corresponding return addresses 271 and 272 from the shadow stack 170, then those return addresses are included in the verified stack trace 220. For example, the comparison 211 is illustrated as determining that the return address 261, from the call stack 160, is the same as the corresponding return address 271 from the shadow stack 170. Such a determination informs the provision 221 of the return address 261, from the call stack 160, into the verified stack trace 220 generated by the verified stack trace generation component 210.

By contrast, if the comparisons of return addresses obtained from the call stack 160 reveal that the return addresses obtained from the call stack differ from the corresponding return addresses from the shadow stack, the correct return address from the shadow stack can be provided as part of the verified stack trace 220. Thus, for example, the comparison 212 is illustrated as determining that the return address 262, from the call stack 160, is not the same as the corresponding return address 272 from the shadow stack 170. For example, as a result of the bug that is being investigated, the return address 262 can have become corrupted, modified, deleted, or otherwise changed from the return address that was originally placed on the call stack 160. However, as detailed above, because the shadow stack 170 is hardware protected, the data stored thereon, such as the return address 272, did not change. Accordingly, the return address 272 represents the correct return address that should be provided for purposes of debugging. Therefore, the comparison 212, revealing that the return address 262 is not correct, informs the provision 222 of the return address 272, from the shadow stack 170, as part of the verified stack trace 220. As shown, therefore, the verified stack trace 220 comprises data from the call stack 160, including the other stack data 169 that represents data that is part of the call stack 160 but is not duplicated in the shadow stack 170 by the hardware-implemented mechanisms described above. In addition, the verified stack trace 220 also comprises data from the shadow stack 170, including, for example, the return address 272, thereby correcting incorrect information, such as the exemplary corrupted return address 262 that was part of the call stack 160.

While illustrated in the exemplary system 200 of FIG. 2 as replacing an incorrect address with a known correct address, the verified stack trace generation component 210 can implement alternative mechanisms in the event that a comparison, such as the exemplary comparison 212, reveals that return address data differs between the call stack 160 and the shadow stack 170. For example, it can be beneficial to know what the difference is, since the specific corruption, modification, or other like change experienced by the return address 262 can be useful in debugging. In such an instance, the verified stack trace generation component 210 can be set to provide both the return address 262 and the return address 272 in the verified stack trace 220. According to one aspect, the return address 272 is explicitly indicated as being a known correct address, while the return address 262 is additionally provided for further debugging information.

In some instances, to obtain return addresses from the location stored the values of the call stack 160, stack tracing, also referred to as "stack unwinding" or "stack backtracing" may have to be performed. Stack unwinding entails the utilization of information currently available from a stack to decipher specific information, such as the return addresses, based on the processing performed by the computer-executable instructions that were being executed prior to the obtaining of the stack data. Such stack unwinding operations are computationally expensive in that they consume additional processor cycles, memory requirements, and other like computational resources.

According to one aspect, therefore, the verified stack trace generation component 210 can avoid, or minimize, such stack unwinding by skipping the comparisons between the return addresses on the call stack 160 and the corresponding return addresses on the shadow stack 170, such as the exemplary comparisons 211 and 212. Instead, the verified stack trace generation component 210 can simply obtain the return addresses, such as the exemplary return addresses 271 and 272, directly from the shadow stack 170, without any need to unwind, reference, or compare to, the return addresses from the call stack 160. The verified stack trace generation component 210 simply utilizes the return addresses obtained from the shadow stack 170 in the verified stack trace 220. For the reasons detailed above, the return addresses obtained from the shadow stack 170 are known to be correct and unmodified, and, therefore, uncorrupted.

In generating the verified stack trace 220, the verified stack trace generation component 210 can optionally generate an indication 230 that the verified stack trace 220 comprises return addresses whose correctness has been verified by reference to the shadow stack 170. The generation of such an indication 230 is graphically illustrated by the action 231 in FIG. 2. The indication 230 can be in the form of a textual indication that is presented to a user performing debugging with the verified stack trace 220. Alternatively, or in addition, the indication 230 is accompanied by cryptographically-based indicators attesting to the truth of the verification, of the return addresses present in the verified stack trace 220, by reference the shadow stack 170.

In some instances, it can be desirable to minimize the processing of the data obtained from the call stack 160, such as the aforedescribed replacement of return addresses from the call stack 160 that are determined to be incorrect with corresponding return addresses from the shadow stack 170 that are known to be correct. In such an instance, such processing can be performed only if a threshold level of data corruption or incorrectness is achieved. For example, as a precursor to performing the replacement of, for example, the return address 262 with the return address 272, as illustrated by the action 222, the verified stack trace generation component 210 first determines how many of the return addresses from the call stack 160, such as the exemplary return addresses 261 and 262, differ from their corresponding return addresses in the shadow stack 170, such as the exemplary return addresses 271 and 272, respectively. The subsequent replacing, such as the exemplary replacing 222, of return addresses from the call stack 160 with return addresses from the shadow stack 170 is performed only if greater than a threshold quantity, or greater than a threshold percentage, of the return addresses obtained from the call stack 160 differ from the corresponding return addresses obtained from the shadow stack 170.

In addition to providing verified stack trace generation to aid in debugging by providing known correct data, and identifying, and/or correcting known incorrect data, the mechanisms described herein provide further debugging advantages in the form of triaging efficiencies for debugging that is performed at a subsequent time. More specifically, on personal computing devices, it is common for software developers to execute computer-executable instructions, and then, upon determination that an unexpected consequence has occurred, performing debugging immediately thereafter. In such instances, a stack trace, such as from the call stack 160, is immediately evaluated and analyzed for debugging purposes, potential causes of the bug are identified, potential ameliorative corrections are made, and the, now corrected, computer-executable instructions are again executed. Such a process can be repeated until the bug is resolved and the unexpected consequence no longer occurs.

However, in cloud computing environments, server computing environments or other like remote execution computing environments, it may be impractical or undesirable to perform debugging at the time that an unintended consequence occurs. Instead, in such instances, a collection of data is performed at the time that an unintended consequence occurs, and that data is subsequently evaluated for debugging purposes. Because debugging has not yet occurred, there is no known, or even suspected, cause for the bug. As a result, it is difficult to know in advance which data will be relevant to resolving the bug. Moreover, failure to retain the relevant data further hinders debugging efforts. Indeed, if the data that was retained does not include the relevant data, the retained data can be worthless. Accordingly, when data is collected for subsequent debugging purposes, a large, potentially overinclusive, set of data is collected including, for example, data from the call stack 160 and the shadow stack 170, as well as information from the memory 130, the CPU 120 and other like data. The collection of such data is referred to as a data "dump". In certain computing environments, such as cloud computing environments, a data dump can be many gigabytes in size. Accordingly, it is desirable that at least an initial analysis of data dumps be promptly performed and, if possible, triaging be performed based on such an initial analysis. Often due to the quantity of data being generated, and the frequency with which it is generated, such initial analysis is automated.

In particular, known issues, or bugs, can be catalogued for subsequent resolution. To facilitate the debugging of such bugs, analysis can be undertaken of multiple data dumps associated with a single catalogued bug. By way of a simple example, if the presentation of a drop-down font menu on a cloud-hosted word processor results in display fragmentation, the identification of such an unintended consequence can be in the form of a catalogued bug that can be associated with a description of the unintended consequence, and can further be associated with multiple data dumps that can subsequently be analyzed to perform debugging and resolve the bug. In many instances it is easier to identify characteristics of the bug, such as the presence of specific data structures in specific locations in memory, then it is to identify the causes of the bug. As a result, the characteristics of a known, catalogued bug can be utilized to identify data dumps that are associated with that known bug. As a greater quantity of data dumps associated with a known, catalogued bug are obtained, debugging may be made easier, such as by the identification of common factors, or the elimination of diverse factors as potential causes of the bug.

Figure 3:
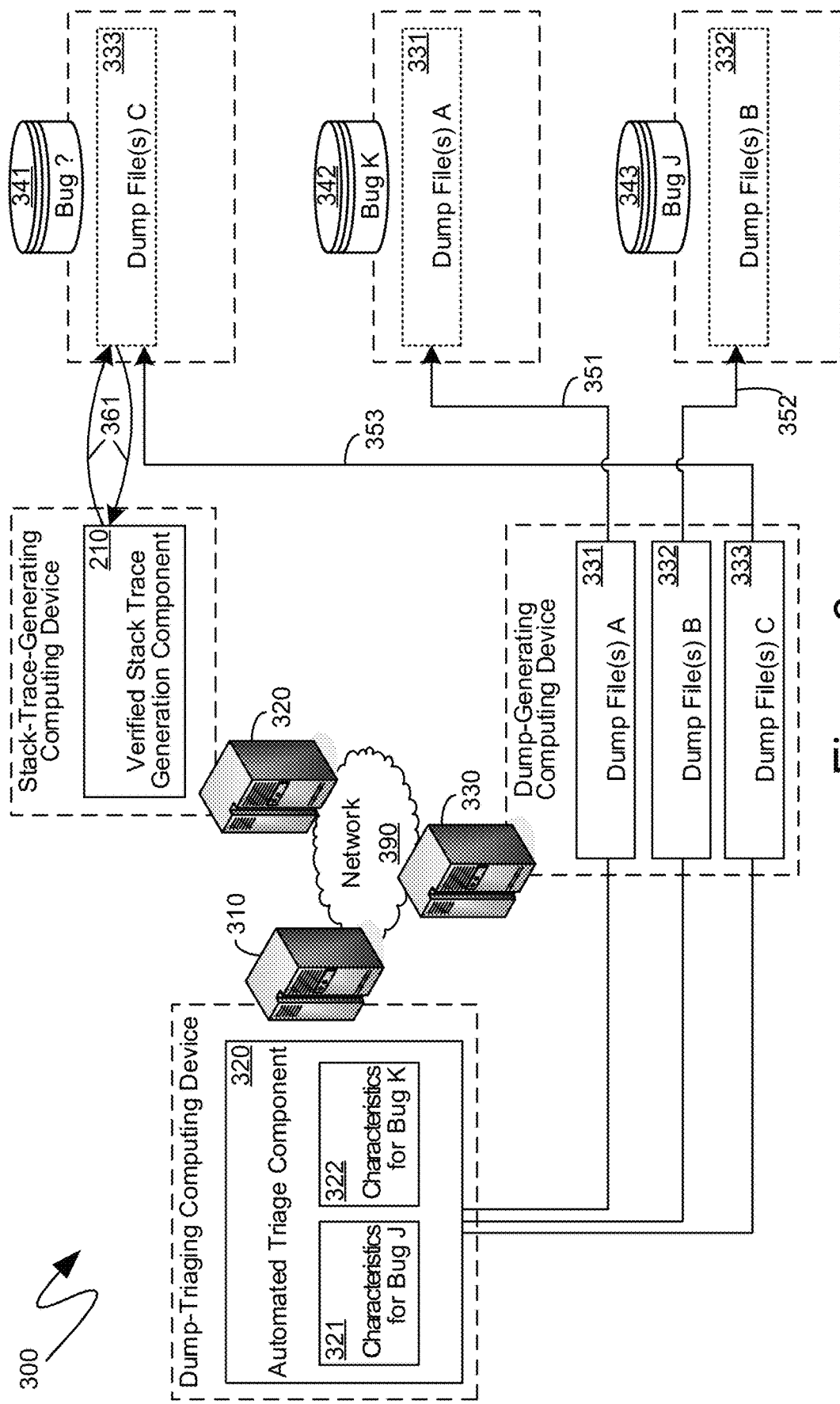
FIG. 3 is a system diagram of an exemplary triaging of dumps of data based on shadow stack information contained therein.

Turning to FIG. 3, the exemplary system 300 shown therein illustrates an exemplary utilization and extension of the above-described mechanisms to perform triaging more quickly, more efficiently, and with a reduced consumption of computational resources. More specifically, the exemplary system 300 shown in FIG. 3 comprises one or more computing devices, such as the exemplary computing devices 310, 320 and 330, which are communicationally coupled, such as through the exemplary network 390. While illustrated as separate physical devices, the exemplary computing devices 310, 320 and 330 can be a single physical device executing multiple virtual computing devices, or can be a single physical device, or a single virtual device, having instances of dump files, triage components and stack generation components executing and stored thereupon.

Within the exemplary system 300, one or more dump files, such as in accordance with the descriptions provided above, are stored in one or more computing devices. For example, the exemplary system 300 illustrates the exemplary dump files 331, 332 and 333 as being generated, and stored, on the computing device 330, which is an exemplary dump-generating computing device. Additionally, within the exemplary system 300, one or more computing devices are executing automated triage components, such as the exemplary automated triage component 320 being executed by the computing device 310, which is an exemplary dump-triaging computing device. As detailed above, the automated triage component 320 references previously identified characteristics to perform triaging. For example, the automated triage component 320 can compare information from the dump files 331, 332 and 333 to the characteristics 321 determined to be indicative of a known, catalogued bug. If one or more of the dump files 331, 332 and 333 is found to possess the characteristics 321, the automated triage component 320 determines that that dump file is associated with the bug having the characteristics 321, and can, accordingly, associate that dump file with that known, cataloged bug. Such an association can be stored in one or more bug databases. The exemplary system 300 of FIG. 3 illustrates one or more databases that can associate dump files with known, catalogued bugs, including database information 342 containing dump files associated with one known bug and database information 343 containing dump files associated with a different known bug. Subsequent debugging focusing on the bug whose information is catalogued with the database information 343 can reference such information and utilize the dump files linked thereto to perform debugging.

According to one aspect, and for the reasons detailed above, triaging can be performed substantially faster, and with the utilization of substantially fewer computing resources, if stack unwinding for the purpose of obtaining return addresses therefrom can be skipped and otherwise not performed. Accordingly, the automated triage component 320, for example, initially focuses its evaluation of dump files only on those bug characteristics that are revealed in information that would be stored in a shadow stack, such as the aforedescribed return addresses. In such a manner, the automated triage component 320 directly reads such information from the dump files' containing of the shadow stack data and compares such information to those bug characteristics, thereby reducing the expending of computational resources on the automated triaging, and, accordingly, performing the automated triaging more quickly and less expensively.

For example, the exemplary automated triage component 320 parses the dump file 331 and obtains therefrom shadow stack information. The exemplary automated triage component 320 then compares that shadow stack information to the corresponding characteristics of known, catalogued bugs, such as the exemplary characteristics 321 and 322. If there is a match, the automated triage component 320 generates an association, such as through a database or other like data association structure and/or mechanism, between the known, catalogued bug whose characteristics matched the data from the shadow stack that was saved as part of the dump file 331. Within the exemplary system 300 shown in FIG. 3, the action 351 is a graphical representation of the determination, by the automated triage component 320, that the dump file 331 comprises characteristics in its shadow stack data that match shadow stack data characteristics 322 of a known, catalogued bug, and the further association of the dump file 331 with that bug, such as via the generation of identifying or linking information between the dump file 331 and the database 342 by the automated triage component 320. Similarly, the action 352 is a graphical representation of the determination, by the automated triage component 320, that the shadow stack data of the dump file 332 matches shadow stack data characteristics 321 of the known, catalog bug, and the further association of the dump file 332 with that bug, such as via the generation of identifying or linking information between the dump file 332 and the database 343 by the automated triage component 320.

In some instances, the shadow stack data in a dump file may not match any of the shadow stack data that is part of the characteristics of known, catalogued bugs. According to one aspect, in such instances, a slower automated triaging is then performed utilizing the other information in the dump file and comparing that other information to the characteristics of known, catalogued bugs. In such an aspect, shadow-stack-data-based comparisons are an initial automated triage that can be performed quickly and efficiently, as detailed, with traditional automated broader-characteristic-based being relegated to a subsequent automated triage that is performed only on those dump files that were not already associated with known, catalogued bugs by the initial, more efficient automated triaging. The exemplary automated triage component 320 can comprise capability that can perform both the initial, more efficient shadow-stack-data-based automated triaging and the subsequent, slower traditional broader-characteristic-based automated triaging. Alternatively, the exemplary automated triage component 320 can comprise only the capability that can perform the initial, more efficient shadow-stack-data-based automated triaging, with another, different component, either executing on the same computing device 310, or executing on a different computing device, comprising the capability to perform the subsequent, slower traditional broader-characteristic-based automated triaging.

If the automated triaging does not identify a dump file as being associated with a known, catalogued bug, the dump file can be categorized as being associated with one or more unknown bugs, such as is graphically represented by the linking of the dump file 333 with the database 341. The dump files so categorized can receive further scrutiny, such as by the verified stack trace generation component 210, whose operation was described in detail above, and which can execute on a stack-trace-generating computing device, such as the exemplary stack-trace-generating computing device 320. According to one aspect, the evaluation 361, such as by the verified stack trace generation component 210, is performed only after determination that the dump file is associated with an unintended consequence that has not been previously catalogued.

Although not specifically illustrated by the system 300 shown in FIG. 3, according to one aspect, the generation of the dump files themselves, such as the dump files 331, 332 and 333 can be conditioned upon an analysis of the shadow stack. In particular, and as detailed above, return addresses can be obtained from the shadow stack without the processing inefficiencies in unwinding the call stack to obtain return addresses. Accordingly, in the presently described aspect, the return addresses from the shadow stack can be efficiently obtained and compared with the characteristics of known, cataloged bugs. If such a comparison reveals that a particular unintended consequence, such as a particular occurrence of an exception, is associated with a known bug, then a reduced quantity of information can be collected for the dump file. For example, for a known, cataloged bug, specific information may be have been deemed to be useful to debugging the bug and such information can be specifically enumerated so that, if the pre-checking based on the shadow stack determines that the particular unintended consequence is associated with that bug, then the resulting dump file can contain only the specifically enumerated information, to the exclusion of other information that would have normally been included in a dump file. The resulting dump files can be captured more efficiently and can consume fewer memory storage resources.

Figure 4:
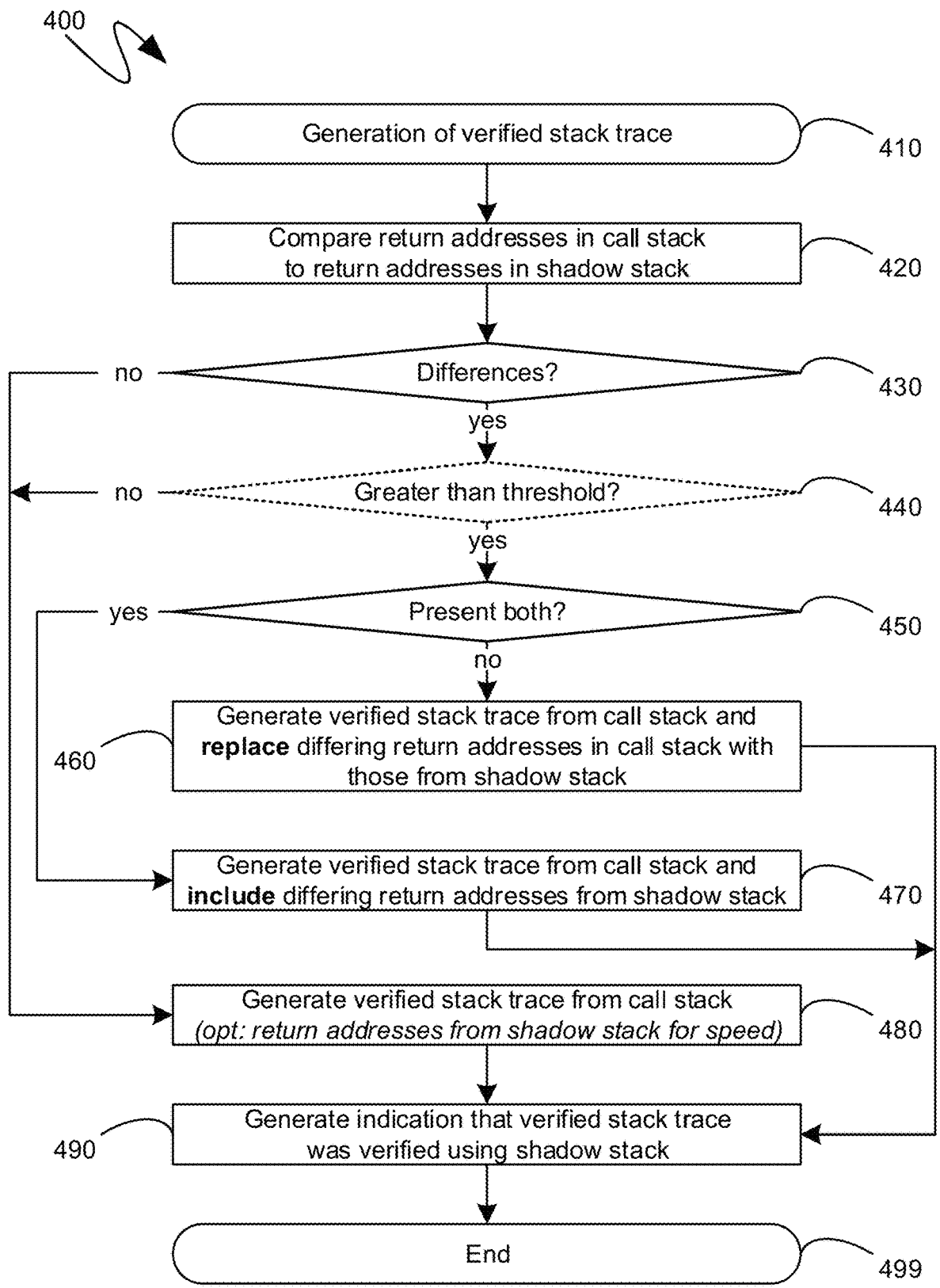
FIG. 4 is a flow diagram of an exemplary generation of a verified stack trace utilizing shadow stack data.

Turning to FIG. 4, the exemplary flow diagram 400 shown therein illustrates an exemplary series of steps that are performed by the verified stack trace generation component 220. Initially, at step 410, generation of a verified stack trace is triggered, such as by the occurrence of an unintended consequence, by the desire to evaluate dump files that are not associated with any currently known bug, or by another trigger. Subsequently, at step 420 return addresses in the call stack are compared to corresponding return addresses in the shadow stack. In some instances, such as when Address Space Layout Randomization ("ASLR") is utilized, return addresses will vary because the base address that an executable is loaded to varies. Therefore, the comparisons of step 420 may be made using the return address directly, or may be based on additional information that may be necessary to derive the correct return address. For example, if it is known that a system randomizes the top N address bits for ASLR, the analysis may consider only the lowest M bits, where the sum of N and M is less than or equal to the total bits in the address. Similarly, if each module has a unique value for its top N address bits, all return addresses having the same top N address bits can be known to originate from the same module. Thus, the comparison may require not only a single match, but that some sequence occurs. As detailed above, in an alternative aspect, the portion of stack unwinding performed to obtain return addresses from the call stack can be avoided for efficiency purposes and the generation of the verified stack trace can simply utilize the return addresses from the shadow stack without performing the comparison at step 420 and the subsequent steps.

At step 430, a determination is made as to whether the comparison of step 420 detected differences. According to one aspect, if no differences were detected, then processing proceeds to step 480 and the verified stack trace is generated from the call stack, or, optionally, for efficiency purposes, simply from the return addresses of the shadow stack as already indicated. At step 490, then, an indication is generated that the verified stack trace was generated utilizing shadow stack data. As indicated previously, such an indication is textual and can optionally comprise a certification or other like cryptographic seal, signature, or indicator of reliability. The relevant processing then ends at step 499.

Conversely, if, at step 430, it is determined that there are differences, then at least some of the return addresses in the call stack may be corrupted or otherwise have been changed and processing proceeds to step 450. As an optional step, step 440 can condition the performance of the subsequent steps on whether an amount of return addresses that differ between the call stack and the shadow stack is greater than a threshold. If step 440 is performed, and it is determined that the amount of return addresses that differ between the call stack and the shadow stack is not greater than the threshold, then processing can skip the remaining steps and proceed, instead, to steps 480 and 490 as described above. For purposes of establishing a threshold against which the amount of return addresses that differ between the call stack and the shadow stack is compared at step 440, a percentage can be utilized, an absolute quantity can be utilized, or combinations thereof.

At step 450, a determination is made, such as by reference to a user established setting, as to whether the call stack version of return address and the shadow stack version of the return address are to both be presented as part of verified stack trace. If, at step 450, it is determined that both should be presented, then processing proceeds to step 470 and the generation of the verified stack trace includes both the return address from the shadow stack, which can further optionally be indicated to be known to be correct, as well as the return address from the call stack, which can further optionally be indicated to be known to be incorrect, or, at least, to be different than the corresponding return address from the shadow stack. Conversely, if, at step 450, it is determined that both do not need to be presented, then processing proceeds to step 460, with the return address from the call stack being replaced with the known correct return address from the shadow stack. After either step 460 or step 470 processing proceeds to step 490 and, ultimately, ending at step 499, as detailed above.

Figure 5:
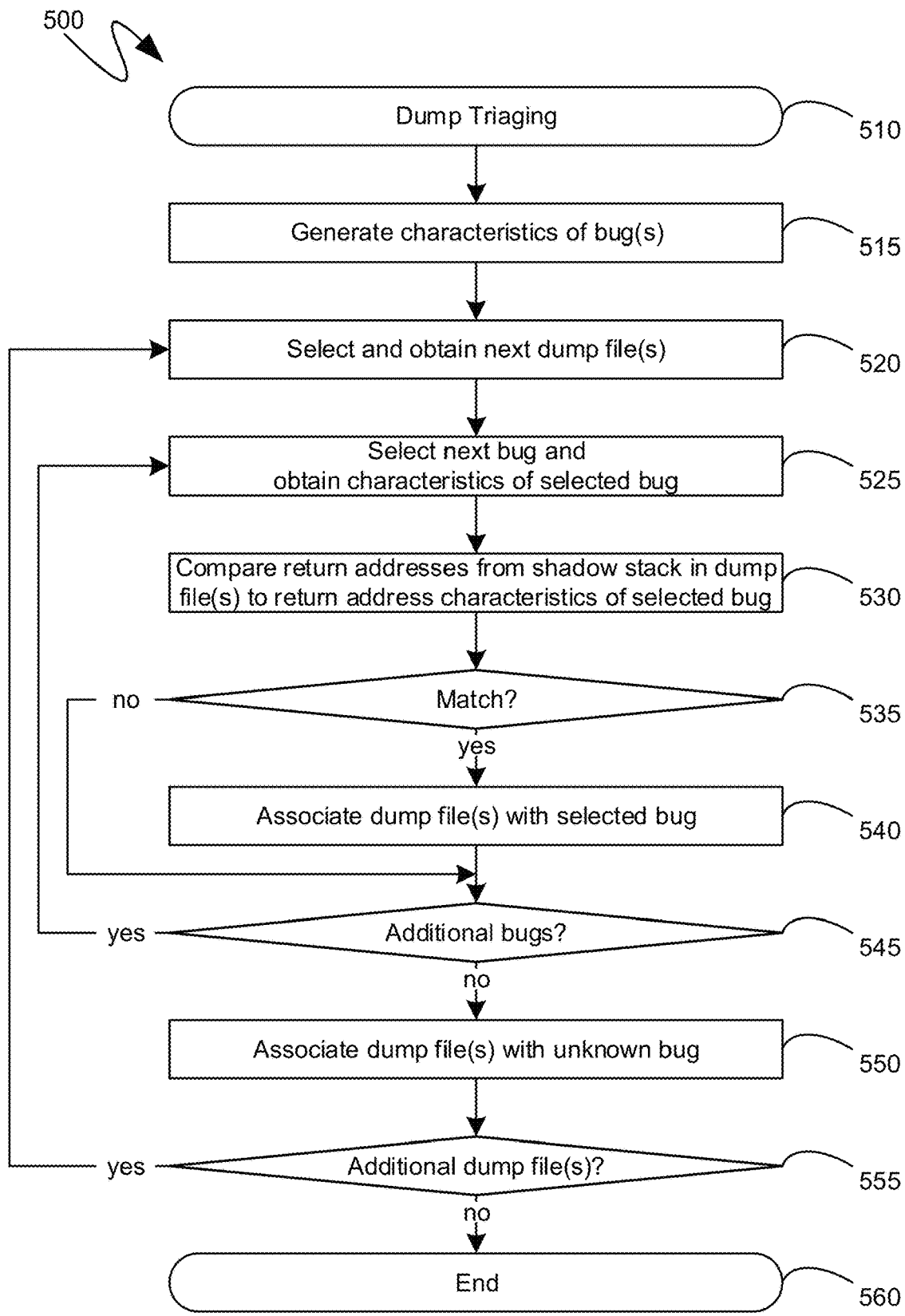
FIG. 5 is a flow diagram of an exemplary triaging of dumps of data based on shadow stack information contained therein.

Turning to FIG. 5, the exemplary flow diagram 500 shown therein illustrates an exemplary series of steps that are performed as part of a faster and more efficient automated dump triaging. As detailed above, such a faster and more efficient automated dump triaging can be performed as an initial triaging step, with a subsequent triaging step utilizing the more complete, but slower characteristic-based triaging of dump files. Initially, at step 510, the faster and more efficient automated dump triaging is initiated. Subsequently at step 515, characteristics of known, catalogued bugs are generated or are previously generated and then obtained at step 515. For example, focusing only on shadow stack data, machine learning algorithms can be utilized to parse existing dump files and generate new characteristics, either for previously unknown bugs, or for currently known bugs, thereby supplementing or verifying current characteristics, or combinations thereof.

Subsequently, at step 520 dump files to be triaged are selected and, at step 525, the characteristics of a bug are selected. At step 530, focusing on shadow stack data, namely return addresses, the shadow stack data from the dump files obtained at step 520 is compared with corresponding data from the characteristics obtained at step 525. Such a comparison can be a one-to-one comparison or it can focus only on specific bits or portions of the obtained return addresses or it can look for predetermined patterns or sequences among multiple return addresses. If there is a match, as determined at step 535, the dump files obtained at step 520 are associated with the bug selected at step 525, as illustrated by step 540. Conversely, if there is no match, as determined at step 535, processing proceeds to step 545 which loops back to step 525 and selects new bugs, and the corresponding characteristics thereof, so long as known, catalogued bugs, with known characteristics, remain to be iterated through utilizing the loop comprising the steps 525 and 545. If processing proceeds through such a loop, and no match is detected at step 535, then the dump files obtained at step 520 are associated with an unknown bug at step 550. As indicated previously, prior to associating the selected dump files of step 520 with an unknown bug at step 550, a subsequent automated dump triaging can be performed utilizing and comparing data from the dump files obtained at step 520 that goes beyond merely the shadow stack data, but requires greater processing resources to perform and is, thereby, slower. In addition, as also detailed above, shadow-stack evaluation, such as that of steps 525 through 550 can be performed as a preliminary determinant that can inform the generation of dump files in the first place. In such an instance, the relevant steps would exclude 510 through 520 and would, instead, commence with the reading of return addresses from the shadow stack upon occurrence of an unintended consequence, and the comparison loop of steps 525 through 550. Performance of step 540 would, in addition, further trigger a more focused dump collection, collecting only the data specified to be relevant to the bug matched at step 535. Conversely, performance of step 550 would result in an omnibus dump data collection, such as would normally be performed. Returning to the automated triaging of already existing dump files, subsequent to step 550, step 555 loops back to step 520 and selects new dump files, so long as dump files remain to be iterated through utilizing the loop comprising the steps 520 and 555. If processing proceeds through such a loop, and no further dump files remain to be automatically triaged, the relevant processing ends at step 560.

Figure 6:
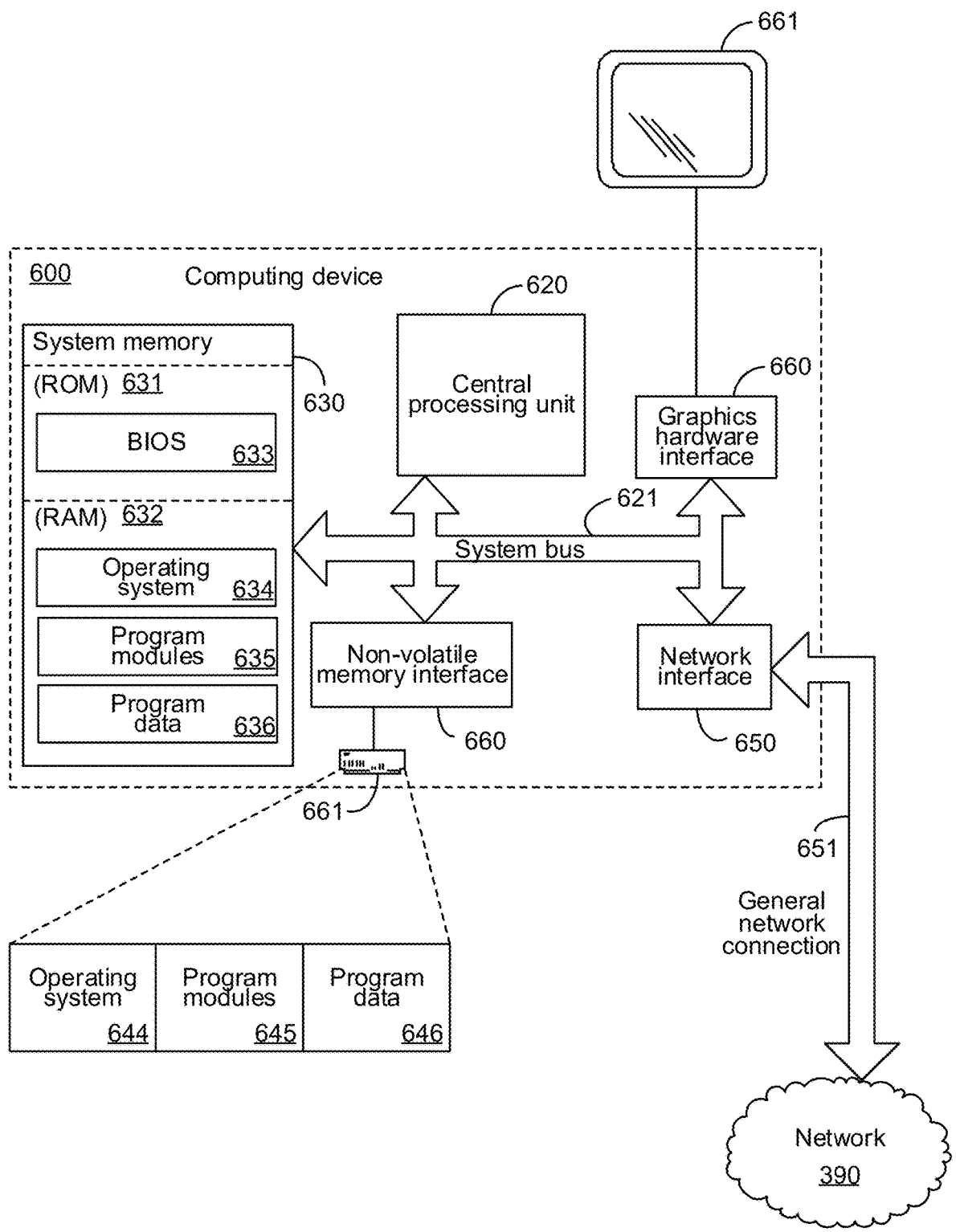
FIG. 6 is a block diagram of an exemplary computing device.

Turning to FIG. 6, an exemplary computing device 600 is illustrated which can perform some or all of the mechanisms and actions described above. The exemplary computing device 600 can include, but is not limited to, one or more central processing units (CPUs) 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. The computing device 600 can optionally include graphics hardware, including, but not limited to, a graphics hardware interface 660 and a display device 661, which can include display devices capable of receiving touch-based user input, such as a touch-sensitive, or multi-touch capable, display device. Depending on the specific physical implementation, one or more of the CPUs 620, the system memory 630 and other components of the computing device 600 can be physically co-located, such as on a single chip. In such a case, some or all of the system bus 621 can be nothing more than silicon pathways within a single chip structure and its illustration in FIG. 6 can be nothing more than notational convenience for the purpose of illustration.

The computing device 600 also typically includes computer readable media, which can include any available media that can be accessed by computing device 600 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 600. Computer storage media, however, does not include communication media. Communication media embodies computer readable instructions, data structures, program modules or other data in a modulated data signal such as a carrier wave or other transport mechanism. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer content between elements within computing device 600, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, other program modules 635, and program data 636.

The computing device 600 may also include other removable/non-removable, volatile/nonvolatile computer storage media. By way of example only, FIG. 6 illustrates a hard disk drive 641 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 641 is typically connected to the system bus 621 through a nonvolatile memory interface such as interface 640.

The drives and their associated computer storage media discussed above and illustrated in FIG. 6, provide storage of computer readable instructions, data structures, program modules and other data for the computing device 600. In FIG. 6, for example, hard disk drive 641 is illustrated as storing operating system 644, other program modules 645, and program data 646. Note that these components can either be the same as or different from operating system 634, other program modules 635 and program data 636. Operating system 644, other program modules 645 and program data 646 are given different numbers hereto illustrate that, at a minimum, they are different copies.

The computing device 600 may operate in a networked environment using logical connections to one or more remote computers. The computing device 600 is illustrated as being connected to the general network connection 651 (to the network 390) through a network interface or adapter 650, which is, in turn, connected to the system bus 621. In a networked environment, program modules depicted relative to the computing device 600, or portions or peripherals thereof, may be stored in the memory of one or more other computing devices that are communicatively coupled to the computing device 600 through the general network connection 661. It will be appreciated that the network connections shown are exemplary and other means of establishing a communications link between computing devices may be used.

Although described as a single physical device, the exemplary computing device 600 can be a virtual computing device, in which case the functionality of the above-described physical components, such as the CPU 620, the system memory 630, the network interface 640, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 600 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a computing device comprising: one or more central processing units that push return addresses onto both a call stack and a shadow stack; and one or more computer-readable storage media comprising computer-executable instructions, which, when executed by at least some of the processing units, cause the computing device to: compare a first return address obtained from the call stack to a corresponding first return address obtained from the shadow stack; and generate a verified stack trace comprising both the first return address obtained from the shadow stack and the first return address obtained from the call stack when the comparing reveals that the first return address obtained from the call stack differs from the corresponding first return address obtained from the shadow stack.

A second example is the computing device of the first example, wherein the computer-executable instructions directed to generating the verified stack trace comprise computer-executable instructions, which, when executed by at least some of the processing units, cause the computing device to: also include, in the verified stack trace, the first return address obtained from the call stack and an indication that the included first return address obtained from the call stack is incorrect when the comparing reveals that the first return address obtained from the call stack differs from the corresponding first return address obtained from the shadow stack.

A third example is the computing device of the first example, comprising further computer-executable instructions, which, when executed by at least some of the processing units, cause the computing device to: generate an indication that the generated verified stack trace comprises return addresses that have been verified using the shadow stack.

A fourth example is the computing device of the first example, wherein the first return address obtained from the shadow stack is only included in the generated verified stack trace if a quantity of return addresses from the call stack that differ from corresponding return addresses from the shadow stack is greater than a threshold.

A fifth example is the computing device of the first example, comprising further computer-executable instructions, which, when executed by at least some of the processing units, cause the computing device to: compare return addresses obtained from the shadow stack to pre-determined characteristics of a first bug, the addresses obtained from the shadow stack comprising the first return address obtained from the shadow stack; determine, based on the comparing, that the return addresses obtained from the shadow stack match the pre-determined characteristics of a first bug; and associate, based on the determining, one or more dump files comprising the return addresses obtained from the shadow stack with the first bug.

A sixth example is the computing device of the first example, comprising further computer-executable instructions, which, when executed by at least some of the processing units, cause the computing device to: compare return addresses obtained from the shadow stack to pre-determined characteristics of cataloged bugs, the addresses obtained from the shadow stack comprising the first return address obtained from the shadow stack; determine, based on the comparing, that the return addresses obtained from the shadow stack do not match the pre-determined characteristics of the cataloged bugs; and generate an indication, based on the determining, that one or more dump files comprising the return addresses obtained from the shadow stack require further review.

A seventh example is the computing device of the sixth example, wherein the computer-executable instructions directed to generating the verified stack trace are executed contingent upon the indication that the one or more dump files comprising the return addresses obtained from the shadow stack require further review.

An eighth example is a computing device comprising: one or more central processing units that push return addresses onto both a call stack and a shadow stack; and one or more computer-readable storage media comprising computer-executable instructions, which, when executed by at least some of the processing units, cause the computing device to: generate a verified stack trace comprising both a first return address obtained from the shadow stack and a corresponding first return address obtained from the call stack, the first return address obtained from the shadow stack differing from the corresponding first return address obtained from the call stack.

A ninth example is the computing device of the eighth example, comprising further computer-executable instructions, which, when executed by at least some of the processing units, cause the computing device to: compare the return addresses obtained from the shadow stack to pre-determined characteristics of a first bug; determine, based on the comparing, that the return addresses obtained from the shadow stack match the pre-determined characteristics of a first bug; and associate, based on the determining, one or more dump files comprising the return addresses obtained from the shadow stack with the first bug.

A tenth example is the computing device of the eighth example, comprising further computer-executable instructions, which, when executed by at least some of the processing units, cause the computing device to: compare the return addresses obtained from the shadow stack to pre-determined characteristics of cataloged bugs; determine, based on the comparing, that the return addresses obtained from the shadow stack do not match the pre-determined characteristics of the cataloged bugs; and generate an indication, based on the determining, that one or more dump files comprising the return addresses obtained from the shadow stack require further review.

An eleventh example is the computing device of the tenth example, wherein the computer-executable instructions directed to generating the verified stack trace are executed contingent upon the indication that the one or more dump files comprising the return addresses obtained from the shadow stack require further review.

A twelfth example is the computing device of the eighth example, comprising further computer-executable instructions, which, when executed by at least some of the processing units, cause the computing device to: generate an indication that the generated verified stack trace comprises return addresses that have been verified using the shadow stack.

A thirteenth example is a system comprising: a dump-generating computing device comprising: one or more dump-generating computing device processing units that push return addresses onto both a call stack and a shadow stack; and one or more dump-generating computing device storage media comprising computer-executable instructions, which, when executed by at least some of the dump-generating computing device processing units, cause the dump-generating computing device to store, on a storage device communicationally coupled to the dump-generating computing device, one or more dump files; and a dump-triaging computing device comprising: one or more dump-triaging computing device processing units; and one or more dump-triaging computing device storage media comprising computer-executable instructions, which, when executed by at least some of the dump-triaging computing device processing units, cause the dump-triaging computing device to: obtain the one or more dump files; parse the one or more dump files for return addresses from the shadow stack; compare the return addresses from the shadow stack to pre-determined return address characteristics of cataloged bugs; and associate the one or more dump files with none or more of the cataloged bugs based on the comparing.

A fourteenth example is the system of the thirteenth example, wherein the comparing determines that the return addresses from the shadow stack match the pre-determined return address characteristics of a first bug from among the cataloged bugs; and wherein further the one or more dump-triaging computing device storage media comprise further computer-executable instructions, which, when executed by at least some of the dump-triaging computing device processing units, cause the dump-triaging computing device to: associate, based on the determination, the one or more dump files with the first bug.

A fifteenth example is the system of the thirteenth example, wherein the comparing determines that the return addresses from the shadow stack do not match the pre-determined return address characteristics of the cataloged bugs; and wherein further the one or more dump-triaging computing device storage media comprise further computer-executable instructions, which, when executed by at least some of the dump-triaging computing device processing units, cause the dump-triaging computing device to: generate an indication, based on the comparing determination, that the one or more dump files require further review.

A sixteenth example is the system of the thirteenth example, wherein the comparing determines that the return addresses from the shadow stack do not match the pre-determined return address characteristics of the cataloged bugs; and wherein further the one or more dump-triaging computing device storage media comprise further computer-executable instructions, which, when executed by at least some of the dump-triaging computing device processing units, cause the dump-triaging computing device to: additionally compare other data from the one or more dump files to corresponding pre-determined characteristics of the cataloged bugs; and associate the one or more dump files with none or more of the cataloged bugs based on the additional comparing; and wherein further the computer-executable instructions performing the additional comparing and the associating based on the additional comparing are only executed if the comparing determines that the return addresses from the shadow stack do not match the pre-determined return address characteristics of the cataloged bugs.

A seventeenth example is the system of the thirteenth example, further comprising a stack-trace-generating computing device comprising: one or more stack-trace-generating computing device processing units; and one or more stack-trace-generating computing device storage media comprising computer-executable instructions, which, when executed by at least some of the stack-trace-generating computing device processing units, cause the stack-trace-generating computing device to: generate a verified stack trace comprising both a first return address obtained from the shadow stack and a corresponding first return address obtained from the call stack, the first return address obtained from the shadow stack differing from the corresponding first return address obtained from the call stack.

An eighteenth example is the system of the seventeenth example, wherein the computer-executable instructions directed to generating the verified stack trace are executed contingent upon an indication that the one or more dump files require further review, the indication that the one or more dump files require further review being based on the comparing determining that the return addresses from the shadow stack do not match the pre-determined return address characteristics of the cataloged bugs.

A nineteenth example is the system of the thirteenth example, wherein the one or more dump-generating computing device storage media comprise further computer-executable instructions, which, when executed by at least some of the dump-generating computing device processing units, cause the dump-generating computing device to: compare, prior to storing the one or more dump files, the return addresses from the shadow stack to the pre-determined one or more return address characteristics of cataloged bugs; and select information from the dump-generating computing device to be stored in the one or more dump files based on the pre-dump-generation comparing.

A twentieth example is the system of the nineteenth example, wherein the computer-executable instructions directed to selecting the information from the dump-generating computing device to be stored in the one or more dump files comprise computer-executable instructions, which, when executed by at least some of the dump-generating computing device processing units, cause the dump-generating computing device to: only select the information from the dump-generating computing device that is specified by a bug catalog entry associated with a first cataloged bug based on the pre-dump-generation comparing determining that the return addresses from the shadow stack match the pre-determined one or more return address characteristics of the first cataloged bug.

As can be seen from the above descriptions, mechanisms for providing verified stack trace generation and accelerating stack-based analysis have been presented. In view of the many possible variations of the subject matter described herein, we claim as our invention all such embodiments as may come within the scope of the following claims and equivalents thereto.

We claim:
1. A system comprising:
a computing device comprising:
one or more processing units; and
one or more storage media comprising computer-executable instructions, which, when executed by the one or more processing units, perform operations to:
obtain one or more dump files;
parse the one or more dump files for return addresses from a shadow stack;
compare the return addresses from the shadow stack to pre-determined return address characteristics of bugs without unwinding a call stack corresponding to the shadow stack; and
associate the one or more dump files with one or more of the bugs based on the comparing.

2. The system of claim 1, wherein:
the comparing determines that the return addresses from the shadow stack match at least some of the pre-determined return address characteristics of a first bug from among the bugs; and
based on the comparing determination, the one or more dump files are associated with the first bug.

3. The system of claim 1, wherein:
the comparing determines that the return addresses from the shadow stack do not match the pre-determined return address characteristics of the bugs; and
based on the comparing determination, an indication is generated that the one or more dump files require further review.

4. The system of claim 1, wherein:
the comparing determines that the return addresses from the shadow stack do not match the pre-determined return address characteristics of the bugs;
other data from the one or more dump files is additionally compared to corresponding pre-determined characteristics of the bugs;
the one or more dump files are associated with one or more of the bugs based on the additional comparing; and
the additional comparing and the associating based on the additional comparing are executed if the comparing determines that the return addresses from the shadow stack do not match the pre-determined return address characteristics of the bugs.

5. The system of claim 1, comprising further computer-executable instructions, which, when executed by the one or more processing units, cause the computing device to:
generate a verified stack trace comprising both a first return address obtained from the shadow stack and a second return address obtained from a call stack, the first return address differing from the second return address.

6. The system of claim 5, wherein the computer-executable instructions directed to generating the verified stack trace are executed contingent upon an indication that the one or more dump files are associated with an unintended consequence that has not been previously catalogued, the indication being based on the comparing determining that the return addresses from the shadow stack do not match the pre-determined return address characteristics of the bugs.

7. The system of claim 1, comprising further computer-executable instructions, which, when executed by the one or more processing units, cause the computing device to:
compare, prior to storing the one or more dump files, the return addresses from the shadow stack to the pre-determined return address characteristics of bugs; and
select information to be stored in the one or more dump files.

8. The system of claim 7, wherein the computer-executable instructions directed to selecting the information to be stored in the one or more dump files comprise computer-executable instructions, which, when executed by at least some of the one or more processing units, further cause the computing device to:
select information that is specified by a bug catalog entry associated with a first bug based on determining that the return addresses from the shadow stack match the pre-determined return address characteristics of the first bug.

9. A method comprising:
parsing, by a triage device, a dump file for return addresses from a shadow stack corresponding to a call stack;
comparing the return addresses to characteristics of at least one bug, wherein the characteristics are stored in a bug tracking data store of the triage device, and wherein the return addresses are obtainable without requiring an unwinding of the call stack;
based on the comparing, determining the return addresses do not match the characteristics of the at least one bug; and
associating the dump file with an unknown bug.

10. The method of claim 9, wherein the characteristics of at least one bug include a specific presence of specific data structures in specific locations in memory.

11. The method of claim 9, the method further comprising:
prior to parsing the dump file, generating, by the triage device, characteristics of catalogued bugs using a machine learning algorithm, the characteristics of the at least one bug being included in the characteristics of catalogued bugs.

12. The method of claim 9, wherein:
determining the return addresses do not match the characteristics of the at least one bug represents a first triage process for the dump file; and
the method further comprises:
in response to determining the return addresses do not match the characteristics of the at least one bug, performing a second triage process for the dump file.

13. The method of claim 12, wherein the second triage process takes more time to complete than the first triage process.

14. The method of claim 9, wherein associating the dump file with the unknown bug comprises:
creating a link between the dump file and the unknown bug; and
storing the link to a bug database comprising at least one other dump file that is associated with a known bug.

15. The method of claim 9, the method further comprising:
in response to determining the return addresses do not match the characteristics of the at least one bug, generating an indication that the dump file requires further review.

16. The method of claim 9, the method further comprising:
in response to determining the return addresses do not match the characteristics of the at least one bug, generating a stack trace that comprises at least one return address from the call stack and at least one corresponding return address from the shadow stack.

17. A device comprising:
a processing unit; and
memory comprising computer-executable instructions that, when executed, perform operations comprising:
- comparing return addresses from a shadow stack to characteristics of a known bug, wherein the known bug is linked to a first dump file in a bug tracking repository of the device, and wherein the return addresses are obtainable without requiring an unwinding of a call stack corresponding to the shadow stack;
- determining the return addresses match the characteristics of the known bug;
- based on the determining, creating an association between the known bug and a second dump file comprising the return addresses; and
- storing the association in the bug tracking repository such that the first dump file and the second dump file are associated with a known bug.

18. The device of claim 17, wherein the shadow stack is generated using a call stack of the device, the call stack comprising at least one return address that is written to the call stack in response to a CALL instruction.

19. The device of claim 18, wherein the return addresses from the shadow stack have been written concurrently to the shadow stack and the call stack.

20. The device of claim 18, wherein the shadow stack is hardware-protected.

* * * * *